United States Patent [19]
Karol

[11] 3,733,815
[45] May 22, 1973

[54] ACTUATING DEVICE FOR A GAS TURBINE ENGINE FUEL CONTROL

[75] Inventor: Joseph A. Karol, Orange, Conn.
[73] Assignee: Avco Corporation, Stratford, Conn.
[22] Filed: Oct. 22, 1971
[21] Appl. No.: 191,742

[52] U.S. Cl. ..................60/39.16 R, 60/39.28 R
[51] Int. Cl. ....................................F02c 3/10
[58] Field of Search ..............60/39.16 R, 39.28 R

[56] References Cited

UNITED STATES PATENTS

| | | | |
|---|---|---|---|
| 3,360,050 | 12/1967 | Sibley | 416/27 |
| 3,240,013 | 3/1966 | Spath | 60/39.16 R |
| 3,621,657 | 11/1971 | Jurisch | 60/39.16 R |
| 3,623,326 | 11/1971 | Greune | 60/39.16 R |
| 3,653,206 | 4/1972 | Gruene | 60/243 |

Primary Examiner—Clarence R. Gordon
Attorney—Charles M. Hogan and Gary M. Gron

[57] ABSTRACT

An operator foot pedal actuates through a linkage a fuel control which meters fuel to the gas generator of a gas turbine engine. A power turbine is driven by the gas generator and is connected to a vehicle transmission. The transmission has a governor which schedules power turbine speed for normal operating conditions. However, at the extremes of idle and maximum power a speed-responsive device shortens or lengthens the effective length of the linkage to vary the output of the gas producer and thus control the speed of the turbine for these conditions.

9 Claims, 1 Drawing Figure

PATENTED MAY 22 1973
3,733,815
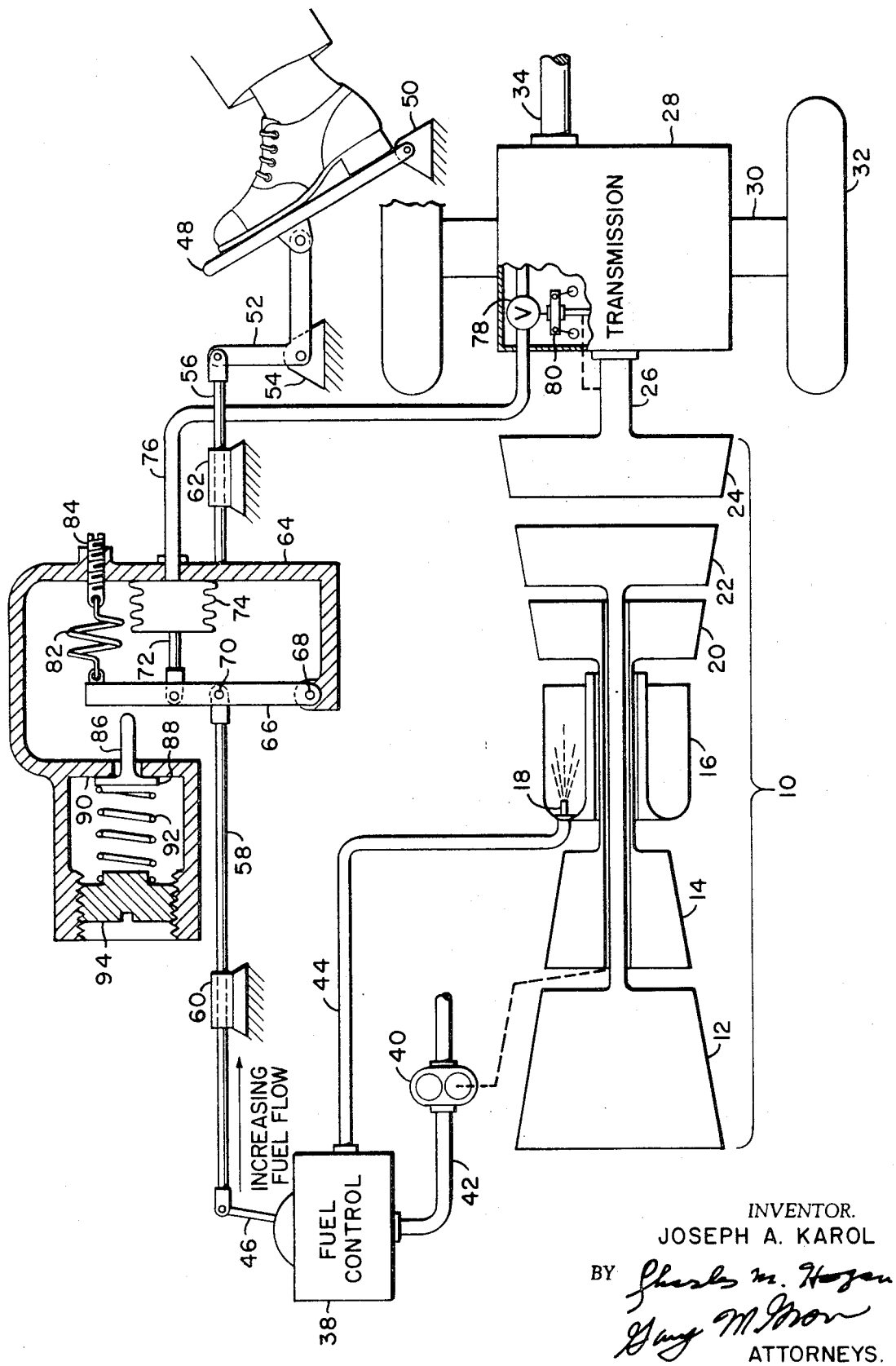
INVENTOR.
JOSEPH A. KAROL
BY
ATTORNEYS.

ACTUATING DEVICE FOR A GAS TURBINE ENGINE FUEL CONTROL

This invention was made under a U. S. Government contract.

The present invention relates to control systems and more particularly to control systems used with gas turbine engines.

In the past several years the gas turbine engine has been incorporated with increasing frequency in land vehicles primarily due to its high efficiency and low level of exhaust emissions. A typical use for a gas turbine engine is in a tank or wheeled vehicle where the exhaust of a gas turbine engine drives a free power turbine connected to a transmission. Since the power turbine operates efficiently over a predetermined horsepower curve, the transmission to which the power turbine is connected has a governor which either causes the transmission to shift gears or to shift its ratio to maintain the power turbine at the R.P.M. corresponding to the required horsepower output.

A problem with this arrangement exists at the extremes of idle and maximum output. During these conditions the transmission cannot shift to maintain the speed of the power turbine. As a result, the engaging of an accessory driven through the transmission, such as a gun turret actuator or a dump mechanism during idle, causes an increase in torque demand which rapidly brings down the speed of the power turbine to a very inefficient level. At the opposite end of the operating range the disengaging of an accessory while the power turbine is at maximum speed will cause a sudden decrease in torque which quickly causes the power turbine to overspeed. While an operator may attempt to control and compensate for these variables, his reaction times are too slow to have any effect.

Accordingly, it is an object of the present invention to provide a control for an engine of the above type that maintains the power turbine operating condition at an efficient level particularly at the extremes of its operating conditions.

In the broader aspects of the present invention these ends are achieved by an operator-manipulated actuating device for the fuel control used to supply fuel to the main gas generator of the gas turbine engine. The actuating device comprises first and second elongated elements extending from an operator station to the fuel control and longitudinally displaceable in a first direction for actuating the fuel control to supply fuel at an increased rate to the engine. A means is interposed between the first and second elements to displace them longitudinally relative to one another and vary their effective length as a function of an engine operating parameter.

The above and other related objects and features of the present invention will be apparent from a reading of the description of the disclosure shown in the accompanying drawing and the novelty thereof pointed out in the appended claims.

In the drawing the single FIGURE illustrates a fuel control actuating device embodying the present invention, along with a gas turbine engine with which it may be used.

Referring to the drawing there is shown a gas turbine engine comprising a main gas generator, generally indicated by the reference character 10. The main gas generator 10 has a low pressure compressor 12 and high pressure compressor 14, both of which pressurize air for delivery to a combustor 16 in which fuel from fuel nozzles 18 is mixed and ignited to provide a hot gas stream. A first turbine stage 20 drives the high pressure compressor 14 and a second downstream turbine stage 22 drives the low pressure compressor 12. The hot gas stream discharged from turbine stage 22 passes across a power turbine 24 and then exhausts to the atmosphere through a suitable duct.

Power turbine 24 drives an output shaft 26 connected to a transmission 28. Transmission 28 has a primary output drive through shafts 30 to ground drive wheels 32 and a secondary output through accessory shaft 34. Transmission 28 may take many forms, as will be apparent to those skilled in the art. In one form the transmission may be purely hydrostatic and comprised of a pair of wobble plate pumps with pivotable wobble plates to vary infinitely the effective speed ratio between the two pumps. In another form the transmission may comprise a hydraulic torque converter connected to a series of change-speed gears actuated through a suitable servomechanism to produce a given gear ratio. The speed of the input shaft 26 and thus the power turbine is controlled by a suitable arrangement within a relatively narrow predetermined range during normal operation of the engine.

A fuel control 38 receives a supply of pressurized fuel from pump 40 via inlet conduit 42. In the fuel control the fuel is metered through a variable orifice and supplied to nozzle supply conduit 44 for delivery to nozzles 18. Fuel control 38 has an input power lever 46 displaceable to the right, as shown on the drawing, to call for an increasing level of fuel flow as modified by various engine operating parameters.

Power lever 46 is actuated by an operator foot pedal 48 pivotally mounted to a base 50. A bell crank 52 pivotally mounted on base 54 connects with foot pedal 48 and with a rod 56. Rod 56 and a rod 58, connected to power lever 46, are respectively longitudinally displaceable in guide bearings 60 and 62 to manipulate power lever 46 in response to inputs on the operator controlled foot pedal 48. It should be apparent that other devices, such as push-pull control cables, may be used in place of rods 56 and 58 with equal results.

Rod 56 connects with a frame 64 which has a lever 66 pivotally mounted to the frame at 68. At an intermediate point 70 on lever 66, rod 58 is connected. At a point further displaced from pivot 68 the actuating rod 72 of an expandable bellows 74 is connected. Bellows 74 receives a pressure signal from a flexible conduit 76 which extends to a valve 78 located in transmission 28. Valve 78 is controlled by a suitable arrangement, such as centrifugally actuated fly-ball weights 80 to control the pressure in conduit 76 and thus bellows 74 at a level directly proportional to the speed of power turbine 26.

The free end of lever 66 is yieldably urged in opposition to the expansion of the bellows by a spring 82 adjustably connected to base 64 by a screw 84. A stop 86 extending from a plate 88 seated on shoulder 90 limits the movement of lever 66 away from rod 56. Plate 88 is yieldably held against shoulder 90 by a spring 92. The force level of spring 92 is varied by an adjustable threaded sleeve 94 which acts on the opposite end of spring 92.

During operation of the engine above idle the speed sensing bellows 74 expands sufficiently to abut stop 86. During this condition the rods 58 and 56 act as a single link with a fixed length so that the output of the fuel control is directly responsive to the operator manipulation of the foot pedal 48.

When the engine is at idle the power turbine speed reduces and hence reduces the pressure in conduit 76. Whenever the speed of the power turbine 24 goes beneath the optimum value, such as when an accessory is engaged, the pressure in the speed sensing bellows 74 is lowered sufficiently so that spring 82 pulls the lever 66 away from stop 86. This displaces levers 56 and 58 relative to one another and thus shortens their effective length. It can be seen that the resultant reduction in length actuates the power lever 46 to an increasing fuel flow level and power output from the main gas generator 10 to maintain the speed of the power turbine 24. When the load is taken off the power turbine speed would increase and the bellows 74 would expand to abut stop 86 and decrease the fuel flow to keep the power turbine at the predetermined efficient level. It should be apparent that the force level of spring 82 may be adjustably varied to maintain a predetermined power turbine speed.

While operating the power turbine at its maximum speed the disengaging of an accessory load causes the power turbine speed to increase. This causes the speed sensing bellows to expand against stop 86 and overcome the force of spring 92. The force level of spring 92 is set to maintain a predetermined maximum safe speed for the power turbine 24. This longitudinally displaces rods 56 and 58 relative to each other, thus increasing their effective length. The result of this is that the power lever 46 is moved to a position calling for lower fuel flow. The reduction in output from the main gas generator 10 causes the power turbine 24 to slow down to a safe level.

It should be noted that the above input to the power lever is in addition to the input supplied by the operator foot pedal 48. The operator can manipulate the foot pedal according to his needs while at the same time the rods 58 and 46 are displaced relative to one another to maintain automatically the power turbine speed at its optimum value.

While a preferred embodiment of the present invention has been described, it should be apparent to those skilled in the art that it may be modified without departing from its spirit and scope. Having thus described the invention what is claimed as novel and desired to be secured by Letters Patent of the United States is:

I claim:

1. An operator-manipulated actuating device for a gas turbine engine fuel control used with a gas turbine engine having a main gas generator and a power turbine driven by said main gas generator, said main gas generator being supplied with fuel by said fuel control, said device comprising:
   first and second elongated elements extending from an operator station to said fuel control and longitudinally displaceable in a first direction for actuating said fuel control to supply fuel at an increased rate to said engine;
   means connecting said elements for varying the resultant length thereof as a function of the power turbine speed of said gas turbine engine.

2. An actuating device as in claim 1 wherein said length-varying means varies the resultant length of said elements only at idle and at maximum speed of said power turbine.

3. An actuating device as in claim 1 wherein said length-varying means comprises:
   a support secured to said first element;
   a level pivotally connected to said support and to said second element;
   a stop for limiting the pivoting of said lever relative to said first element; and
   an actuating device connected to said support and responsive to said engine parameter for pivoting said lever toward and away from said stop, thereby displacing said first and second elements longitudinally relative to one another.

4. An actuating device as in claim 3 wherein said gas turbine engine has a power turbine rotatable in response to gases discharged from a main gas generator and wherein said actuating device pivots said lever as a function of power turbine operating speed.

5. An actuating device as in claim 4 wherein said actuating device comprises:
   a bellows expandable to pivot said lever against said stop; and
   means for generating a hydraulic signal having a pressure directly proportional to power turbine speed whereby an increase in speed expands said bellows.

6. An actuating device as in claim 3 further comprising a yieldable urging means holding said stop in place with a predetermined force, whereby displacement of said actuator against said stop with a force exceeding said predetermined force causes said first and second elements to displace and lengthen said actuating device.

7. An actuating device as in claim 6 wherein said gas turbine engine comprises a main gas generator and a power turbine rotatably driven by a hot gas stream from said generator and wherein:
   said actuating device comprises a bellows connected to said support and expandable in response to a pressure signal to pivot said lever toward said stop; and
   means for generating a pressure signal responsive to power turbine speed.

8. An actuating device as in claim 7 further comprising an operator-manipulated foot pedal at said operator station and secured to one of said elongated elements, whereby depressing the foot pedal actuates said fuel control to a position supplying increasing flow to said main gas generator.

9. An actuating device as in claim 8 in combination with a transmission adapted to be connected to said power turbine and having a fluid pressure signal directly proportional to power turbine speed, thereby providing the pressure input to said bellows.

* * * * *